United States Patent [19]

Dean

[11] Patent Number: 4,826,937

[45] Date of Patent: May 2, 1989

[54] THERMOPLASTIC INTERPOLYMERS OF METHYL METHACRYLATE, N-SUBSTITUTED MALEIMIDES, AND ALKYL ACRYLATES

[75] Inventor: Barry D. Dean, Broomall, Pa.

[73] Assignee: ARCO Chemical Technology, Inc., Wilmington, Del.

[21] Appl. No.: 87,354

[22] Filed: Aug. 20, 1987

Related U.S. Application Data

[62] Division of Ser. No. 825,302, Feb. 3, 1986, Pat. No. 4,696,978.

[51] Int. Cl.[4] .................. C08L 220/52; C08L 222/40; C08L 220/14; C08L 220/18
[52] U.S. Cl. ...................................... 526/262; 525/282
[58] Field of Search .................. 526/262; 525/205

[56] References Cited

U.S. PATENT DOCUMENTS

| | | | |
|---|---|---|---|
| 3,260,686 | 7/1966 | Seifert | 525/262 |
| 3,676,404 | 7/1972 | Nield | 526/262 |
| 4,369,304 | 1/1983 | Gaku et al. | 525/205 |
| 4,696,978 | 9/1987 | Dean | 525/205 |

*Primary Examiner*—Carman J. Seccuro
*Attorney, Agent, or Firm*—Dennis M. Kozak

[57] ABSTRACT

An extrudable acrylic composition which incorporates an interpolymer produced by the polymerization of methyl methacrylate monomer, an N-substituted maleimide monomer, an alkyl acrylate monomer, and a difunctional reactive monomer is disclosed.

11 Claims, No Drawings

THERMOPLASTIC INTERPOLYMERS OF METHYL METHACRYLATE, N-SUBSTITUTED MALEIMIDES, AND ALKYL ACRYLATES

This is a division of application Ser. No. 825,302, filed Feb. 3, 1986, now U.S. Pat. No. 4,696,978.

This invention relates to improved acrylic resins.

In one of its more specific aspects, this invention relates to the modification of alkyl methacrylate homo- and copolymers by the introduction thereinto of an interpolymer formed by the polymerization of methyl methacrylate monomer, an N-substituted maleimide monomer, an alkyl acrylate monomer, and a difunctional reactive monomer.

Alkyl methacrylate polymers, especially poly(methyl methacrylate), which possess the distinctive property of being transparent, are well known. When alkyl methacrylate polymers are fabricated into cast sheets or extruded rods, the fabricated products while having the ability to transfer light usually possess poor impact and heat resistance.

In order to eliminate at least a portion of these difficulties, it is customary to incorporate into an alkyl methacrylate polymer an alkyl acrylate polymeric impact modifier.

Numerous patents address the preparation and use of alkyl acrylate polymers as impact modifies for alkyl methacrylate polymers, for example U.S. Pat. Nos. 3,502,745; 3,661,994 3,676,404; 4,121,016; 4,129,614; 4,217,424; 4,246,374, and 4,473,679. And, U.S. Pat. Nos 3,655,826 and 3,681,475 teach impact modification of thermoplastic acrylic polymers, specifically poly(methyl methacrylate) with alkyl acrylate polymers.

According to this invention, there is provided a composition comprising an interpolymer produced by the polymerization of methyl methacrylate monomer, an N-substituted maleimide monomer, an alkyl acrylate monomer, and a difunctional reactive monomer.

Also, according to this invention, there is provided a method of producing a thermoplastic composition, which comprises incorporating into an alkyl methacrylate polymer matrix an interpolymer comprising the polymerization product of methyl methacrylate monomer, an N-substituted maleimide monomer, an alkyl acrylate monomer, and a difunctional reactive monomer, the interpolymer being present in an amount sufficient to improve at least one property of the extruded alkyl methacrylate polymer.

The alkyl methacrylate polymers, in themselves, are well known in the art as are the methods of preparing them. The term "alkyl methacrylate polymer", as used herein means alkyl methacrylate homo- and copolymers.

The alkyl methacrylate polymers employable in this invention are produced using any suitable prior art methods and include poly(methyl methacrylate), poly(methyl methacrylate-co-styrene), poly(methyl mehacrylate-co-N-substituted maleimide) e.g. poly(methyl methacrylate-co-N-phenylmaleimide), poly(methyl methacrylate-co- α-methylstyrene), poly(methyl methacrylate-co-maleic anhydride), polyglutarimide, and the like and their mixtures.

The interpolymer modifier of this invention is an interpolymer formed by polymerization of methyl methacrylate monomer, an N-substituted maleimide monomer, an alkyl acrylate monomer, and a difunctional reactive monomer wherein the reactive groups are either acrylate or methacrylate.

The interpolymer modifier can be produced using a suitable method of polymerization for example, by emulsion polymerization. The polymerization reaction mixture will contain from about 15 to about 60 weight % methyl methacrylate monomer from about 5 to about 20 weight % N-substituted maleimide monomer, from about 20 to about 80 weight % alkyl acrylate monomer, and from about 0.0001 to about 1 part per hundred parts of total monomer of a difunctional reactive monomer. Preferably the polymerization reaction mixture will contain from about 30 to about 45 weight % methyl methacrylate monomer, from about 10 to about 15 weight % N-substituted maleimide monomer, from about 40 to about 60 weight % alkyl acrylate monomer and from about 0.001 to about 0.01 part per hundred parts of total monomer of a difunctional reactive monomer.

The N-substituted maleimide monomer may be selected from the group consisting of N-alkylmaleimides such as N-methylmaleimide, N-ethylmaleimide and the like or N-arylmaleimides such as N-phenylmaleimide, N-(2-chloro) phenylmaleimide, N-(4-methyl)phenylmaleimide, N-(4-cyano) phenylmaleimide, N-(2,4,6-tribromo)phenylmaleimide, and the like, and their mixtures. The preferred N-substituted maleimide monomer is N-phenylmaleimide.

The alkyl acrylate monomer may be selected from methyl acrylate, ethyl acrylate, propyl acrylate, n-butyl acrylate, hexyl acrylate, dodecyl acrylate, 2-ethylhexyl acrylate, 2-(2-ethoxyethoxy)ethyl.acrylate, and the like, and their mixtures. The preferred alkyl acrylate is n-butyl acrylate.

Representative examples of the difunctional reactive monomers suitable for uses to produce the interpolymer of this invention include but not limited to, tetraethyleneglycol diacrylate, tetraethyleneglycol dimethacrylate, trimethylolpropane di- or triacrylate, triallyl isocyanurate and the like, and their mixtures. Tetraethyleneglycol diacrylate is preferred.

The interpolymer modifier of this invention consists of a methyl methacrylate/N-substituted maleimide copolymer and an alkyl acrylate homopolymer which are chemically and/or physically linked as a result of the presence of the difunctional reactive monomer during the free radical polymerization.

The methyl methacrylate/N-substituted maleimide copolymer of the interpolymer should have a number average molecular weight (Mn) as measured by gel permeation chromatography relative to polystyrene standards of from about 150,000 to about 450,000; preferably from about 200,000 to about 400,000. The alkyl acrylate homopolymer portion of the interpolymer should have a number average molecular weight (Mn) as measured by gel permeation chromatography relative to polystyrene of from about 150,000 to about 500,000; preferably from about 200,000 to about 400,000.

The glass transition temperature of the methyl methacrylate/N-substituted maleimide copolymer of the interpolymer as measured by differential scanning calorimetry (DSC) should be greater than 120° C. and preferably greater than 140° C. The glass transition temperature of the alkyl acrylate homopolymer as measured by DSC should be less than 0° C. and preferably less than −20° C.

The alkyl methacrylate homo- and copolymer matrices for which the interpolymer serves as both a heat distortion temperature modifier and an impact modifier are those alkyl methacrylate homo- and copolymers which (1) exhibit thermodynamic miscibility with the methyl methacrylate/N-substituted maleimide copolymer portion of the interpolymer and (2) are immiscible with the alkyl acrylate homopolymer portion of the interpolymer. Thermodynamic miscibility between two polymers exists if a blend of the two polymers results in a single phase characterized by a single glass transition temperature value which is intermediate between the glass transition temperatures of the two respective polymers. Thus, a blend of the interpolymer of this invention with an alkyl methacrylate homo- or copolymer matrix will result in a blend which exhibits two glass transition temperatures, one characteristic of the alkyl acrylate homopolymer of the interpolymer which is immiscible with the alkyl methacrylate homo- or copolymer matrix and the second characteristic of the single phase formed between the methyl methacrylate/N-substituted maleimide copolymer of the interpolymer and the alkyl methacrylate homo- or copolymer matrix as a result of the thermodynamic miscibility.

The modified acrylic polymers according to this invention can be prepared using any suitable conventional method of combining polymers such as, melt mixing, as taught in the Examples which follpw. The interpolymer will be incorporated into the alkyl methacrylate polymer to provide a polymer blend which contains in weight percent, from about 60 to about 95, preferably from about 70 to about 90 alkyl methacrylate polymer and from about 5 to about 40, preferably from about 10 to about 30 interpolymer.

The interpolymer modifier described above when incorporated into an alkyl methacrylate homo- or copolymer matrix results in a transparent thermoplastic composition useful for glazing applications, lighting applications e.g. automobile taillights and other optical applications requiring toughness, high heat and transparency.

The following examples illustrated the methods involved in the preparation of the interpolymer modifier of the invention and the use of the interpolymer modifier as a dual impact modifier/heat distortion modifier for alkyl methacrylate homo- and copolymers.

EXAMPLE I

This example demonstrates the preparation of an interpolymer modifier of this invention and its incorporation into a poly(methyl methacrylate) matrix.

A 1-liter resin kettle was charged with about 300 grams of water, about 2.6 grams of sodium dodecylbenzene sulfonate, about 100 grams of n-butyl acrylate monomer, about 75 grams of methyl methacrylate monomer, about 25 grams of N-phenylmaleimide, about 0.21 gram of tetraethyleneglycol diacrylate, about 80 milliliters of a 2% aqueous potassium persulfate solution and about 2 milliliters of a 0.1% aqueous sodium bisulfite solution. The emulsion reaction was stirred at about 300 rpm at a reaction temperature of about 63.5° C. for about four hours. The resulting interpolymer was recovered as a powder by coagulation of the emulsion with a saturated calcium chloride solution. The interpolymer exhibited two glass transition temperatures by DSC: −32° C. and 146° C. The nitrogen content of the interpolymer was measured to be 1.0 weight percent which corresponded to a 12.3 weight percent N-phenylmaleimide content. The yield of interpolymer was 195 grams (97%).

The resulting interpolymer was blended with poly(methyl methacrylate) (PMMA) [PLEXIGLAS® V-052, commercially available from Rohm & Haas] as follows. In a Brabender mixing apparatus a PMMA/interpolymer blend (80:20 wt. %) was prepared at 220° C. for five minutes at 63 rpm. The resulting blend was removed from the mixing head and test specimens were compression molded to evaluate notched Izod impact strength and deflection temperature under load (in accordance with ASTM procedures D-256 and D-648, respectively). A comparison of the data in Table I demonstrates the enhanced physical properties of the PMMA/interpolymer blend of the invention as compared to the base PMMA resin.

TABLE I

| | | |
|---|---|---|
| PMMA (wt. %) | 100 | 80 |
| Interpolymer of Example 1 (wt. %) | 0 | 20 |
| Tg (°C.) | 105 | 112 |
| DTUL (°F.) | 171 | 179 |
| Notched Izod (ft-lbs/in) | 0.5 | 2.6 |
| % Transmittance Visible Light | 92 | 86 |

EXAMPLE 2

This example also demonstrates the preparation of an interpolymer of this invention and its incorporation into a poly(methyl methacrylate) matrix. A 1-liter resin kettle was charged with about 300 grams of water, about 2.6 grams of sodium dodecylbenzene sulfonate, about 75 grams of n-butyl acrylate monomer, about 25 grams of ethyl acrylate monomer, about 75 grams of methyl methacrylate monomer, about 25 grams of N-phenylmaleimide monomer, about 0.21 gram of tetraethyleneglycol diacrylate, about 80 milliliters of a 2% aqueous potassium persulfate solution and about 2 milliliters of a 0.1% aqueous sodium bisulfite solution. The emulsion reaction was stirred at about 300 rpm at a reaction temperature of 63.5° C. for about four hours. The resulting interpolymer was recovered as a powder by coagulation of the emulsion with a saturated calcium chloride solution. The interpolymer exhibits two glass transition temperatures by DSC: −27° C. and 147° C. The nitrogen content of the interpolymer was 1.1 weight percent which corresponded to a 13.5 weight percent N-phenylmaleimide content. The yield of interpolymer was 194 grams (96.5%).

The resulting interpolymer was blended with PLEXIGLAS® V-052 resin in a Brabender mixing apparatus at 220° C. for five minutes at 63 rpm. The resulting PMMA/interpolymer blend (80:20 wt %) was removed from the mixing head and test specimens were compression molded for physical property evaluation. A comparison of the data in Table 2 demonstrates the enhanced physical properties of the PMMA/interpolymer blend of the invention as compared to the base PMMA resin.

TABLE 2

| | | |
|---|---|---|
| PMMA (wt. %) | 100 | 80 |
| Interpolymer of Example 2 (wt. %) | 0 | 20 |
| Tg (°C.) | 105 | 111.5 |
| DTUL (°F.) | 171 | 179 |
| Notched Izod (ft-lbs/in) | 0.5 | 2.3 |
| % Transmittance Visible Light | 92 | 87 |

EXAMPLE 3

This example also demonstrates the preparation of an interpolymer of this invention and its incorporation into a poly(methyl methacrylate) matrix. A 1-liter resin kettle was charged with about 300 grams of water, about 2.6 grams of sodium dodecylbenzene sulfonate, about 75 grams of n-butyl acrylate monomer, about 25 grams of methyl acrylate monomer, about 75 grams of methyl methacrylate monomer, about 25 grams of N-phenylmaleimide, about 0.21 gram of tetraethyleneglycol diacrylate, about 80 milliliters of a 2% aqueous potassium persulfate solution and about 2 milliliters of a 0.1% aqueous sodium bisulfite solution. The emulsion reaction was stirred at about 300 rpm at a reaction temperature of 63.5° C. for four hours. The resulting interpolymer was recovered as a powder by coagulation of the emulsion with a saturated calcium chloride solution. The interpolymer exhibits two glass transition temperatures by DSC: −21° C. and 145° C. The nitrogen content of the interpolymer was 1.0 weight percent which corresponded to a 12.3 weight percent N-phenylmaleimide content. The yield of interpolymer was 196 grams (97%).

The resulting interpolymer was blended with PLEXIGLAS® V-052 in a Brabender mixing apparatus at 220° C. for five minutes at 63 rpm. The resulting PMMA/interpolymer blend (80:20 wt. %) was removed from the mixing head and test specimens were compression molded. The molded specimens exhibited the physical properties shown in Table 3 as compared to the base PMMA resin.

TABLE 3

| | | |
|---|---|---|
| PMMA (wt. %) | 100 | 80 |
| Interpolymer of Example 3 (wt. %) | 0 | 20 |
| Tg (°C.) | 105 | 112.5 |
| DTUL (°F.) | 171 | 180 |
| Notched Izod (ft-lbs/in) | 0.5 | 2.5 |
| % Transmittance Visible Light | 92 | 89 |

EXAMPLE 4

This example also demonnstrates the preparation of an interpolymer of this invention and its incorporation into a poly(methyl methacrylate) matrix. A 1-liter resin kettle was charged with about 300 grams of water, about 2.6 grams of sodium dodecylbenzene sulfonate, about 75 grams of n-butyl acrylate, about 25 grams of 2-(ethoxyethoxy)ethyl acrylate, about 75 grams of methyl methacrylate monomer, about 25 grams of N-phenylmaleimide, about 0.21 grams of tetraethyleneglycol diacrylate, about 80 milliliters of a 2% aqueous potassium persulfate solution and about 2 milliliters of a 0.1% aqueous sodium bisulfite solution. The emulsion reaction was stirred at about 300 rpm at a reaction temperature of about 63.5° C. for four hours. The resulting interpolymer was recovered as a powder by coagulation of the emulsion with a saturated calcium chloride solution. The interpolymer exhibits two glass transition temperatures by DSC: of −38° C. and 147° C. The nitrogen content of the interpolymer was 1.1 weight percent which corresponded to a 13.5 weight percent N-phenylmaleimide content. The yield of interpolymer was 195 grams (97%).

The resulting interpolymer was blended with PLEXIGLAS® V-052, in a Brabender mixing apparatus at 220° C. for five minutes at 63 rpm. The resulting PPMA/interpolymer (80:20 wt. %) blend was removed from the mixing head and specimens were compression molded to evaluate notched Izod impact strength and deflection temperature under load. A comparison of the data in Table 4 demonstrates the physical properties of the invention as compared to the base PMMA resin.

TABLE 4

| | | |
|---|---|---|
| PMMA (wt. %) | 100 | 80 |
| Interpolymer of Example 4 (wt. %) | 0 | 20 |
| Tg (°C.) | 105 | 113 |
| DTUL (°F.) | 171 | 181 |
| Notched Izod (ft-lbs/in) | 0.5 | 3.2 |
| % Transmittance Visible Light | 92 | 88 |

EXAMPLE 5

This example serves to compare the interpolymer modifiers of this invention with a commercially available impact modified poly(methyl methacrylate) resin, PLEXIGLAS® DR resin commercially available from Rohm & Haas. To prepare the compositions of this invention PLEXIGLAS® V-052 and the interpolymers were physically mixed and extruded into pellets.

The PLEXIGLAS® DR and the PMMA/interpolymer blends of this invention were separately injection molded into test specimens at a pyromelt temperature of 215° C. Table 5 presents the physical property comparison between the commercially available impact modified PMMA and the PMMA/interpolymer modifier compositions of this invention.

TABLE 5

| | | | |
|---|---|---|---|
| PLEXIGLAS® DR (wt. %) | 100 | 0 | 0 |
| PLEXIGLAS® V-052 (wt. %) | 0 | 80 | 80 |
| Interpolymer of Example 1 (wt. %) | 0 | 20 | 0 |
| Interpolymer of Example 4 (wt. %) | 0 | 0 | 20 |
| Tg (°C.) | 104 | 112 | 113 |
| DTUL (°F.) | 163 | 179 | 181 |
| Notched Izod (ft-lbs/in) | 2.3 | 3.8 | 4.5 |
| GFWI (in-lbs) | 48 | 88 | 118 |
| Elongation (%) | 31 | 57 | 64 |
| Flexural Modulus | 270,900 | 343,100 | 346,500 |

The data of Table 5 shows the compositions of the invention to possess enhanced physical properties as compared to a commercially available impact modified PMMA.

EXAMPLE 6

This example demonstrates the use of the interpolymers described by this invention as impact modifiers for an alkyl methacrylate copolymer matrix resin.

A poly(methyl methacrylate-co-N-phenylmaleimide) copolymer (76/24 wt. %) was blended with the interpolymer prepared according to the procedure described in Example 4 in a Brabender Mixing aparatus at 240° C. for five minutes at 63 rpm. Table 6 shows the impact strengths for various MMA/N-PMI:interpolymer compositions.

TABLE 6

| | | | |
|---|---|---|---|
| MMA/N-PMI (wt. %) | 100 | 80 | 60 |
| Interpolymer of Example 4 (wt. %) | 0 | 20 | 40 |
| Tg (°C.) | 144 | 144 | 145 |
| Notched Izod (ft-lbs/in) | 0.7 | 1.8 | 3.4 |
| % Transmittance Visible Light | 86 | 80 | 79 |

The data of Table 6 show the interpolymers of the invention serve to enhance the impact properties of a poly(methyl methacrylate-co-N-phenylmaleimide) copolymer.

It will be evident from the foregoing that various modifications can be made to the invention. Such, however, are considered as being within the scope of this invention.

What is claimed is:

1. A thermoplastic interpolymer consisting essentially of a copolymer protion linked to a homopolymer portion through a difunctional reactive monomer prepared in a one step free radical polymerization of from about 15 to about 60 wt. % methyl methacrylate monomer, from about 5 to about 20 wt. % of an N-substituted maleinide monomer, from about 20 to about 80 wt.-% of an alkyl acrylate monomer, and from about 0.0001 to about 1 part per hundred parts of total monomer of a difunctional reactive monomer wherein said copolymer portion of the interpolymer is a copolymer of said methl methacrylate and N-substituted maleimide monomers, and wherein said homopolymer portion of the interpolymer is a homopolymer of said alkyl acrylate monomer.

2. The thermoplastic interpolymer of claim 1 in which said difunctional reactive monomer is selected from the group consisting of diacrylates and dimethacrylates.

3. The thermoplastic interpolymer of claim 1 in which said alkyl acrylate monomer is selected from the group consisting of methyl acrylate, ethyl acrylate, and n-butyl acrylate.

4. The thermoplastic interpolymer of claim 1 in which said difunctional reactive monomer is tetraethlene glycol diacrylate.

5. The thermoplastic interpolymer of claim 1 in which said N-substituted maleimide is N-phenyl maleimide.

6. The thermoplastic interpolymer of claim 1 which is prepared in said one-step free radical polymerization by reacting from about 30 to about 45 wt.-% methyl methacrylate monomer, from about 10 to about 15 wt.-% of said N-substituted maleimide monomer, from about 40 to about 60 wt.-% of said alkyl acrylate monomer, and from about 0.001 to about 0.01 part per hundred parts of total monomer of said difunctional reactive monomer.

7. The composition of claim 1 in which said alkyl acrylate homopolymer has a glass transistion temperature as measured by differential scanning calorimetry of less than 0° C.

8. The composition of claim 1 in which said methyl methacrylate/N-substituted maleimide copolymer has a glass transition temperature as measured by differential scanning calorimetry of greater than 120° C.

9. The composition of claim 1 in which said alkyl acrylate homopolymer has a number average molecular weight (Mw) as measured by gel permeation chromatography relative to polystyrene standards of from about 150,000 to about 450,000.

10. The composition of claim 1 which said methyl methacrylate/N-substituted maleimide copolymer has a number average molecular weight (Mw) as measured by gel permeation chromatography relative to polystyrene standards of from about 150,000 to about 450,000.

11. The composition of claim 1 which said N-substituted maleimide is selected from the group consisting of N-alkylmaleimides and N-arylmaleimides.

* * * * *